No. 732,934. PATENTED JULY 7, 1903.
F. F. GERDING.
COTTON CHOPPER.
APPLICATION FILED JAN. 23, 1902.
NO MODEL. 2 SHEETS—SHEET 1.
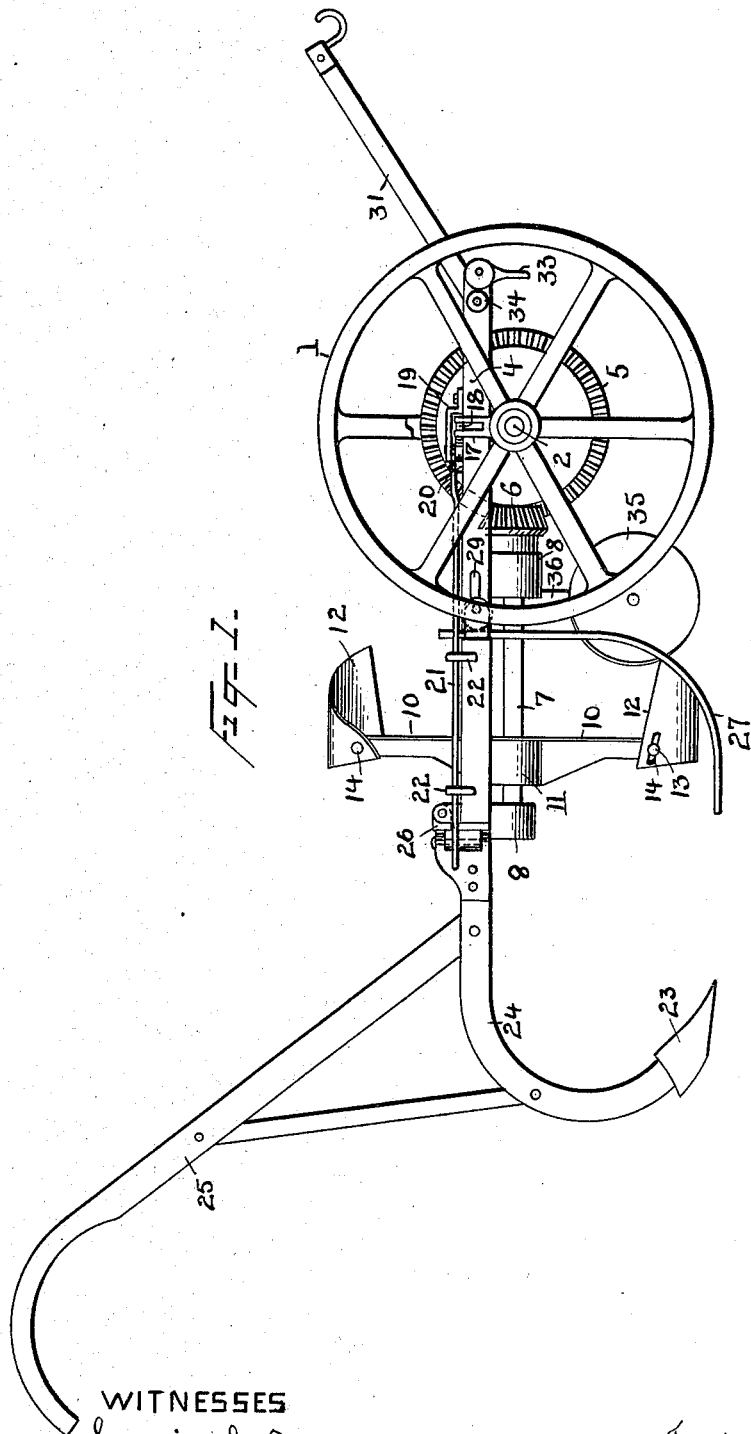
WITNESSES
Norris A. Clark.
R. S. C. Caldwell.
INVENTOR
Fred F. Gerding,
by E. H. Gelston
ATT'Y

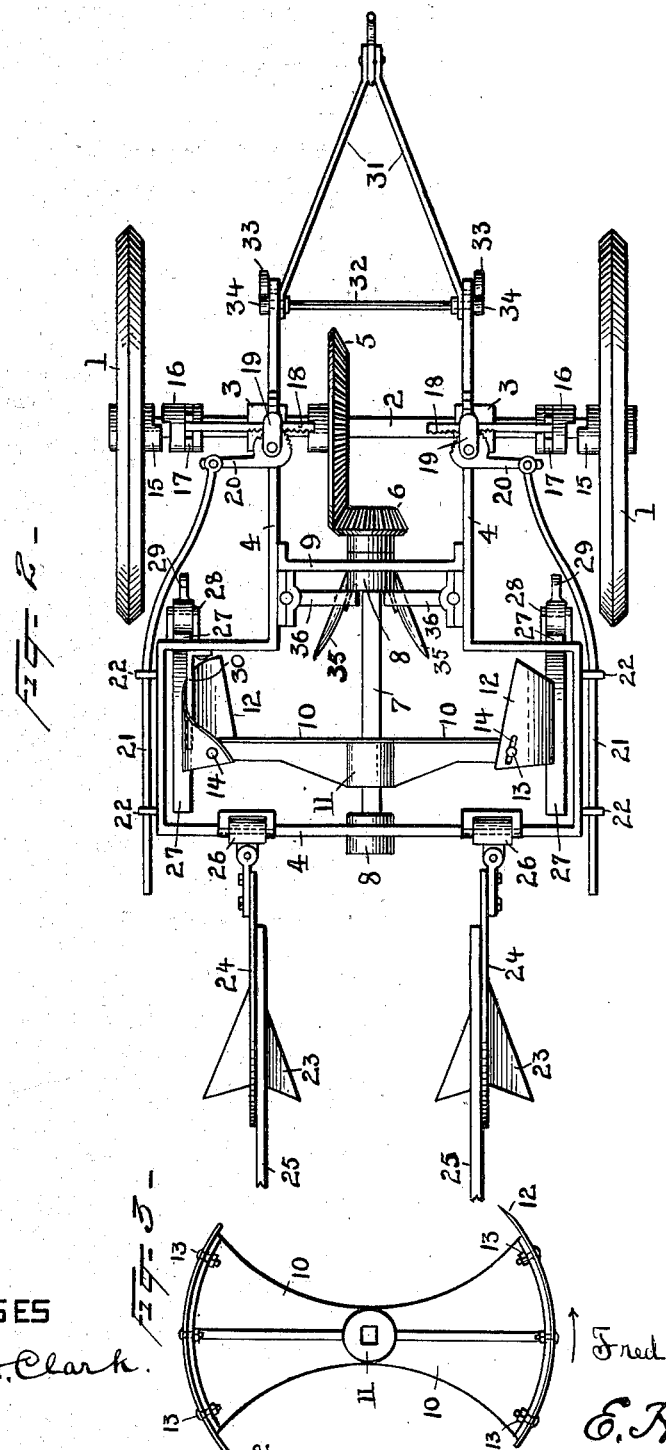

No. 732,934.

Patented July 7, 1903.

UNITED STATES PATENT OFFICE.

FRED F. GERDING, OF GROESBECK, TEXAS.

COTTON-CHOPPER.

SPECIFICATION forming part of Letters Patent No. 732,934, dated July 7, 1903.

Application filed January 23, 1902. Serial No. 90,934. (No model.)

*To all whom it may concern:*

Be it known that I, FRED F. GERDING, a citizen of the United States, residing at Groesbeck, in the county of Limestone and State of Texas, have invented certain new and useful Improvements in Cotton-Choppers; and I do hereby declare the following to be a full, clear, and exact description of the invention, such as will enable others skilled in the art to which it appertains to make and use the same.

My invention relates to certain new and useful improvements in cotton-choppers, and has for its object to produce a device of this nature which shall be strong and durable in its construction, while at the same time being so flexible in its operation that all of its parts may be adjusted to suit the particular requirements of any condition of soil or growth of cotton.

With the above and other objects in view my invention further consists in the novel details of construction and combination of parts to be clearly described in the following specification, and fully set forth in the claims.

Referring to the accompanying drawings, forming a part of this application, and in which like characters of reference indicate same parts throughout the several views, Figure 1 is a side elevation of my improved cotton-chopper with a portion of one of the spokes of traction-wheel broken away to show the clutch mechanism. Fig. 2 is a top plan view thereof, with the handles broken for convenience; and Fig. 3 is a rear elevation of the chopping-wheel.

In the drawings, 1 represents a pair of traction-wheels loosely mounted on a drive-shaft 2, square in cross-section, which is rounded at its ends and journaled through bearings 3, depending from the opposite sides of the forward end of a hollow T-shaped frame 4.

A gear-wheel 5 is rigidly mounted on the shaft 2 between the sides of the frame 4 and meshes with a pinion 6, carried on the forward end of a work-shaft 7, also square in cross-section and rounded at its ends, where it is journaled in bearings 8, depending, respectively, from the rear end of the frame 4 and from a cross-beam 9, extending across the frame from side to side at about midway the length of said frame.

A cutter-wheel is rigidly mounted on the work-shaft 7 and comprises a web 10 in the shape of a disk with arc-shaped cut-away portions at either side, a hub 11, on which the web is supported, and a pair of acute triangular cutter blades or hoes 12, bent to lie close against the peripheral flanges of the web with one long edge sharpened and the other long edge adjustably secured to the peripheral flanges of the web by bolts 13, passing through perforations 14 of the blades, the perforations in the pointed end of the blade being circular to fit the bolts passing therethrough and the other perforations being elongated slots, in which their bolts may move to permit the swinging of the blades on the first-named bolts in adjusting the position of said blades to vary their cut, as hereinafter explained.

A clutch mechanism is provided for each traction-wheel to enable the parts just described to be driven by the motion of the machine, and as these are similar in construction a description of one will suffice. The hub 15 of the traction-wheel is shouldered to form one member of the clutch, and a correspondingly-shouldered sleeve 16 is mounted on the square shaft 2, so as to be slidable thereon, but being incapable of turning independently of said shaft 2. A yoke 17 has its depending arms sliding in an annular groove of the sleeve 16, and its upper end is carried by a rack-bar 18, sliding within a housing 19 on the frame 4, so as to mesh with and be reciprocated by a gear-crank 20 to open and close the clutch by the operation of said gear-crank 20. A handle 21 is pivoted to the free end of the gear-crank 20 and extends along the rear part of the frame, where it is supported in suitable guides 22 to within reach of operator. When the clutches are closed, the shaft 2 is rotated with the traction-wheels and drives the cutter-wheel by means of the gear connection therewith.

A pair of cultivator plow-points 23 are mounted on separate beams 24 and each is provided with its handle 25 and is pivoted to the rear of the frame 4 by means of the double-action hinges 26, which permit an independent vertical or horizontal swing of either plow.

Curved metal drags or guide-shoes 27 extend upward through brackets 28 on the shoulders of the frame 4, where they are adjustably held by means of the eccentric clamps 29, so that the depth of the cut of the blades 12 may be regulated by adjusting the guide-shoes higher or lower in the frame.

A scraper 30 is secured to the frame, so as to project into the path of the blades 12 and be brushed against by them as they leave the ground to scrape off any dirt adhering thereto.

To the front end of the frame 4 a forked connection 31 is mounted on a rod 32, to which its ends are rigidly connected, and this rod 32 is free to turn in the frame 4, except when the eccentric clamps 33 are engaged with the enlarged knobs 34 on the ends of said rod 32, when the connection 31 is held in any adjusted position.

A pair of disk cultivators 35 are mounted on crank-rods 36, which project beneath the machine, having their upper ends adjustably secured to the frame by bolted clamp-plates 37, and these disks 35 are for the purpose of cutting and removing dirt and grass from the sides of the row of cotton.

The machine is drawn by a team of horses hitched to the connection 31, and on going to and from the field the clutches are thrown out of connection, so that the cutting mechanism is inactive, and the handles 25 are swung up on their hinges 26 to lie on top of the machine. In the field the machine is set so that the wheels straddle a row of cotton, the drag-shoes 27 are adjusted vertically to determine the depth of cut of the blades 12, and the clutches are connected, when a forward movement of the machine rotates the cutter-wheel, causing the two blades to cut the cotton from the row in small furrows, leaving patches or stands of cotton therebetween. To regulate the amount of cotton cut by each revolution of the cutter-wheel, the bolts of the blades are loosened and the blades swung thereon farther front or back, as the case may be.

An advantage of the independent plows 23, mounted on the double-action hinges 26, is that these parts can be moved by the operator, as it suits his pleasure, to follow crooked rows of cotton, to escape obstructions, and for dropping trash which accumulates thereon.

As will be seen from the drawings, the gearing is such as to cause the cutter-blades to rotate with their acute angles or points foremost, and as their front edge is sharpened they cut with a shearing action, due to the incline of the cutting edge and the forward motion of the machine.

The hoes 12 can be set so as to cut out all of the cotton or to leave enough cotton standing to secure a good crop, usually about four inches. Now to double the distance, which will be from six to ten inches between stands, one of the hoes is moved forward. Then this hoe will cut out every alternate stand, leaving the stands double the distance apart.

Having fully described my invention in detail, what I claim as new, and desire to secure by Letters Patent, is—

1. In a cotton-chopper, a cutter-wheel mounted to rotate transversely to the direction of motion of the machine, comprising a disk-shaped web with peripheral flanges and cut-away portions in its periphery, a hub on which the web is supported, and triangular cutter-blades pivoted at one angle to the peripheral flange and adjustably secured at another angle to the peripheral flange.

2. In a cotton-chopper, a hollow T-shaped frame, a drive-shaft journaled across the stem or front portion of the frame, a pair of traction-wheels mounted on the drive-shaft and located at the sides of the stem portion of the frame, a work-shaft journaled lengthwise of the frame and receiving motion from the drive-shaft, a cutter-wheel mounted on the work-shaft to rotate within the hollow head or cross portion of the frame, and guide-shoes adjustably clamped to the shoulders or the front edges of the cross portions of the frame.

3. In a cotton-chopper, a hollow T-shaped frame, a drive-shaft journaled across the stem or front portion of the frame, a pair of traction-wheels mounted on the drive-shaft and located at the sides of the stem portion of the frame, a work-shaft journaled lengthwise of the frame and receiving motion from the drive-shaft, a cutter-wheel mounted on the work-shaft to rotate within the hollow head or cross portion of the frame, and a scraper mounted on the shoulder or front edge of the cross portion of the frame to brush against the cutter-blades as they pass.

In testimony whereof I affix my signature in presence of two witnesses.

FRED F. GERDING.

Witnesses:
A. J. HARPER,
I. D. BELL.